United States Patent [19]

Matthews

[11] Patent Number: 6,124,935

[45] Date of Patent: *Sep. 26, 2000

[54] PIPE FITTING ALIGNMENT SYSTEMS

[76] Inventor: David S. Matthews, 810 Salem Dr., Ballston Spa, N.Y. 12020

[ * ] Notice: This patent issued on a continued prosecution application filed under 37 CFR 1.53(d), and is subject to the twenty year patent term provisions of 35 U.S.C. 154(a)(2).

This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/732,886

[22] Filed: Oct. 17, 1996

Related U.S. Application Data

[63] Continuation-in-part of application No. 08/417,383, Apr. 5, 1995, Pat. No. 5,568,265.

[51] Int. Cl.$^7$ .............................. G01B 11/26; G01C 15/00
[52] U.S. Cl. .............................. 356/399; 33/286; 356/138
[58] Field of Search ..................... 356/138, 139, 356/250, 153, 399–400, 152.1, 139.05, 5.09, 4.01, 3.16; 33/DIG. 21, 286, 290–291, 293–295

[56] References Cited

U.S. PATENT DOCUMENTS

| | | |
|---|---|---|
| 3,815,250 | 6/1974 | Roodvoets et al. ................ 33/286 |
| 4,828,377 | 5/1989 | Putland . |
| 5,148,232 | 9/1992 | Duey et al. . |
| 5,400,514 | 3/1995 | Imbrie et al. ....................... 33/286 |
| 5,519,942 | 5/1996 | Webb .................................. 33/290 |
| 5,566,459 | 10/1996 | Breda ................................. 33/290 |
| 5,621,531 | 4/1997 | Van Andel et al. ............ 356/399 |

*Primary Examiner*—K. P. Hantis
*Attorney, Agent, or Firm*—Schmeiser, Olsen & Watts

[57] ABSTRACT

Alignment system and method for use by pipefitters. A portable hand tool having the appearances of a flashlight and the capability of projecting a collimated, coherent or otherwise directed, highly focused and narrow light beam is provided a coupling device on the end opposite the light emanation end, swivel capability about its elongate axis and bubble-type level devices. A targeting subsystem, for use with the light emanating tool, completes the alignment system. A portion of the targeting subsystem uses a vertically adjustable stand having a bracket useful both for alignment of piping and/or pipe supports, as well as for securing target placards. The target placards are indexed referencing elements that are capturable by the stand bracket or otherwise suspendable pipe straps and brackets (supports). The system lends itself to highly diverse forms of application, in a host of piping and plumbing system installations, and is readily manipulable by a single person.

14 Claims, 12 Drawing Sheets

PIPE FITTING ALIGNMENT SYSTEMS

CROSS-REFERENCES TO RELATED APPLICATIONS

This application is a continuation in part of Ser. No. 08/417,383, filed on Apr. 5, 1995 now U.S. Pat. No. 5,568,265.

BACKGROUND OF THE INVENTION

1. Field of the Invention

This invention relates generally to a pipe fitting alignment method and, particularly, to use of an alignment system which employs a tool that projects a highly focused or collimated beam of light.

2. Discussion of Relevant Art

Several constructions exist in the art for the alignment of conduit, such as sprinkler or sewer pipes, that employ coherent light sources and various target apparata. Most relevant to the instant invention are U.S. Pat. No. 3,631,601 ('601), No. 4,968,147 ('147), and No. 4,681,439 ('439).

Patent '601 employs a laser beam to set a series of pipe sections in place along a predetermined line and grade by mounting the laser projector inside of a first pipe section preset on the desired line and grade by conventional surveying techniques. Using adjusting screws on its mounting housing, the laser projector is set within the first pipe section and precisely centered on a remote target position on the proper grade and line. With a laser beam projecting down the desired pipeline, at the proper grade angle, successive pipe sections are set in place by placing the target within each successive pipe section and moving each pipe section laterally or vertically as required to center the target on the laser beam. Thus, there is disclosed a laser projector, free-standing within a pipe section, an auxiliary power supply for the laser projector and, at least one pipe section embracing a moveable target therein. Notable incidents of this disclosure are: the projector is set inside the pipe bore, in fact, entirely enclosed within the bore; there is no alignment with the central axis of the pipe or conduit itself; and, the procedure is extremely labor intensive.

Patents No. '147 and '439 are issued to the same inventor and disclose a target insert for use with a laser aligning system and a pipe laying method and apparatus, respectively. Of '147, a base target apparatus is disclosed for aligning a length of pipe along the longitudinal axis of a pipe string wherein the target apparatus includes a base unit, containing a target unit, and having one tapered end which is dimensioned to be received in the bell end of the pipe. The other end of the base unit is provided with an anchor unit which is dimensioned to be fictionally engaged in the spigot end of the length of pipe. The target disclosed is square in geometry and bears thereon a set of crosshairs or indices. It is captured in a hoop, that is secured to a spigot end of a pipe, so that the target is presented in a plane transverse to the pipe centerline. To the extent that the target is embraced by the pipe, or a stylized extension thereof, it is analogous to the '601 apparatus. In a not too dissimilar vein, '439 discloses a method and apparatus which are employed to give the operator of excavating equipment a quick and accurate visual indication of the amount of excavation required to obtain a desired grade level. The apparatus comprises: a laser unit; a representative pipe section; a centerline target unit; and, a grade checker unit. Alignment of a laser beam projected from the laser unit to selected portions of a stationary target element and of an adjustable target element, on the centerline target unit and the grade checker unit respectively, determines the desired grade depth. The significant aspects of '439 are: the laser unit is a free-standing projector, that is, it stands on the grade or ground over which the pipe is to lay; the centerline target unit is embraced by the representative pipe section; and, the stationary target element is placed downrange of the laser beam, is free-standing and contains adjustable panels within its framework. The method of applying '439 is practically identical to that of '601, the exception being that rather than place sections of the pipe in the downrange centerline of the projected beam, a plurality of targets, adjustable to give the laser beam observer an indication of how high or low a particular targets's base index is off the laser beam centerline, is deployed. Once the positions are denoted and the proper reference depth is read, excavation is commenced to the proper grade and depth so that the selected pipework may lay coaxially along the laser beam downrange centerline. As in '601, the method and apparatus of '439 is extremely labor intensive.

Although the aforementioned systems are of significant value in their work environment, what is needed for the lone individual tradesman is a pipe fitting alignment system that is less costly to realize and set up, less time consuming to align and is within the capability of a single person to use.

3. Incorporation by Reference

In order to make the instant disclosure completely comprehensive with respect to the field, U.S. Pat. No. 3,631,601, No. 4,968,147 and, No. 4,681,439 are hereinafter incorporated by reference.

SUMMARY OF THE INVENTION

The instant invention provides a method for installing piping such as sewage and drainage piping, above- and below-ground sprinkler systems, suspended electrical conduit systems, shipyard and plumbing systems of all types and underground sewage line distribution networks such as found in septic systems. The predominate feature of the system, the alignment tool, is an axially adjustable, level-containing elongate tool that projects a collimated beam of light, generally a coherent form such as a laser beam, toward a downrange target. By means of a coupling device, the tool is attached to a preset, but not fixed, piece of pipe or conduit that is to be extended as a piping network. Adapters are used as required to mate the coupling device end of the tool to the starter piece of conduit or pipe. Then, by suitable fixing means, (e.g. tightening, cementing, or friction) the starter pipe portion is securely fixed and the tool remains in its predetermined position, in preparation for casting the downrange collimated or coherent beam of light. Targets are established downrange of the laser beam by one of two preferred methods: (1) a removable, indexed placard, effective for illumination by the light beam is inserted into a bracket holder having a cup or "U" shape and which is attached to the topmost extension of a vertically adjustable stand; and (2) a circular indexed placard that is adapted by use of adhesive tape tab, for capture or embracement by the pipe strap hoops/brackets and the inner surfaces of pipes/conduits. The circular indexed placard could also be made of a magnetic material so as to magnetically attach to metal strap hangars. The circular indexed placard could also be attached using a combination of an adhesive tape tab and the magnetic material to attached to the metal strap hangars. The circular targets have the added feature of construction in several diameters such that they may be either inserted in the hoops/pipes, with the adhesive tabs and/or magnetic material securing them within, or merely placed at the rims of a hoop/pipe with the tabs and/or magnetic material providing the same securement means. Any of these target placards is readily perforated on the centerline of the indices or crosshairs. This allows, in the case of multiple target usage, an established laser beam to project through the successive target placards as they are set up on a downrange centerline as traced for later pipe, conduit or bracket installation.

Regarding the alignment tool itself, there is provided a housing having an elongate axis and containing therein a collimated light source. One end of the tool bears a coupling device. An example of a coupling device may be outer male threads and inner female threads, both sets of threads having standard diameters that are encountered in the trade of usage. Another example of a coupling device may be a smooth fitting surface on either the interior surface, exterior surface, or both. The housing is also adapted with a swivel for rotating the tool axially after the coupling device end is secured in the aforementioned first pipe section of the system to be constructed. Bubble levels are provided in the housing so that adjustments in the initial alignment can be readily made by a single person having, at most, one free hand. An internal battery source is provided for energizing the laser circuitry, but an external source is also available as shown in prior art applications. Other incidents, besides the targeting apparatus are the various adapter couplings found commonly throughout the trade. These are used in cases where the outer or inner diameter of the tool coupling device end must be adapted to a particular size pipe.

DETAILED DESCRIPTION OF THE PREFERRED EMBODIMENT

Figure 1:
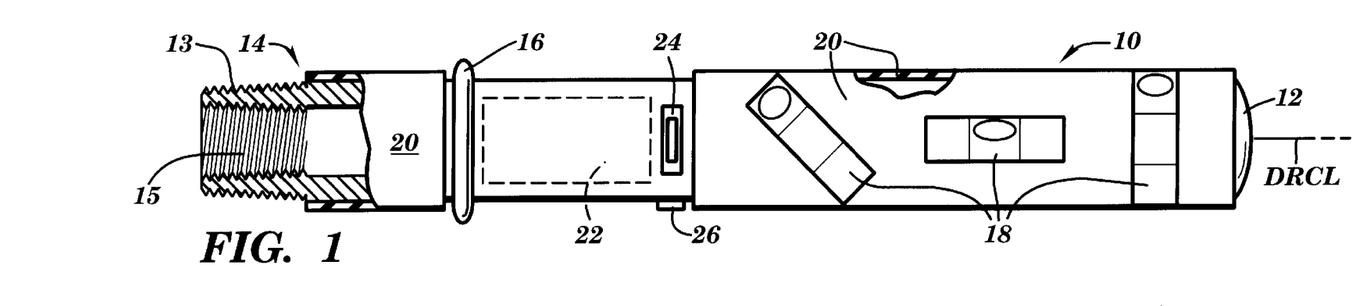
FIG. 1 is an illustration of the alignment tool with a threaded coupling device.

The heart of the alignment system is a hand-held alignment tool 10. The elongate tool resembles, in a few aspects, a common flashlight; but apart from this remote similarity, it differs greatly in operation and application. Within the elongate structure 10, there is contained circuitry and optics 12 for generating and emanating a collimated or coherent beam of light. At the end opposite light emanation there is provided a coupling device. For example the coupling device may be a set of threads 14 in which an external male thread 13, consisting of a standard such as one inch, and an internal threading or female thread 15 of a lower standard thread, say five or seven-eighths inch. Interposed the two ends, but proximate the threaded end, is a swivel 16 that allows both ends to be rotated up to 360° relative to each other. The tool body is made of hardened steel, plastic, or an equivalent durable material with an outside rubber padding 20. This padding 20 holds firmly in place a plurality of bubble levels 18. The padding 20 prevents damage to the tool as well as provides a securement for the bubble levels 18. Proximate the operating circuitry (not shown) of the laser is a battery compartment 22, an operating (on/off) switch 24 and a port 26 for connection of external power. The laser is capable of operation on internal battery power (of 3–6 volts) or external power, as is known in the art, for up to several hours. Beam projection is a minimum of 100 feet using a laser diode having a 670 nanometer rating. As shown in FIG. 1, light emanation is projected along an axis termed the downrange centerline DRCL.

Application of the tool in the alignment method is rather straight forward. Consider the setup of FIG. 2, an overhead structure S is to be used for suspending therefrom a sprinkler system consisting in a network of pipes. Beginning at the left hand side of the figure with an inlet piping 29, at the desired height, an elbow and a pipe end 30 are snugly but not permanently fixed as shown. If using the threaded coupling device the tool 10 is threaded into the end pipe 30 and, here, connected by cable 28 to external power supply 25. Using the bubble level 18 of the tool 10, a proper grade or pitch 36 is determined and the pipes, including the (end) pipe 30 are secured by cementing or other means known in the trade.

Once the grade 36 is established and the tool is operated, the grade 36 becomes the downrange centerline DRCL. A series of suspensions 32 are then made from the supporting structure S. As will be seen more clearly in the discussion of FIG. 8, pipe straps 32 are fitted with brackets 34 of a circular configuration. The brackets are used to capture circular placards that serve as targets of the invention. As each target, beginning proximate the tool 10, is properly aligned and reflective of the downrange emanation of the tool 10, the extension and brackets are secured and the next succeeding suspensions and brackets 32/34 are constructed. In cases where the piping suspension is not too high, a targeting stand is used as disclosed in FIGS. 3 and 4.

Figure 2:
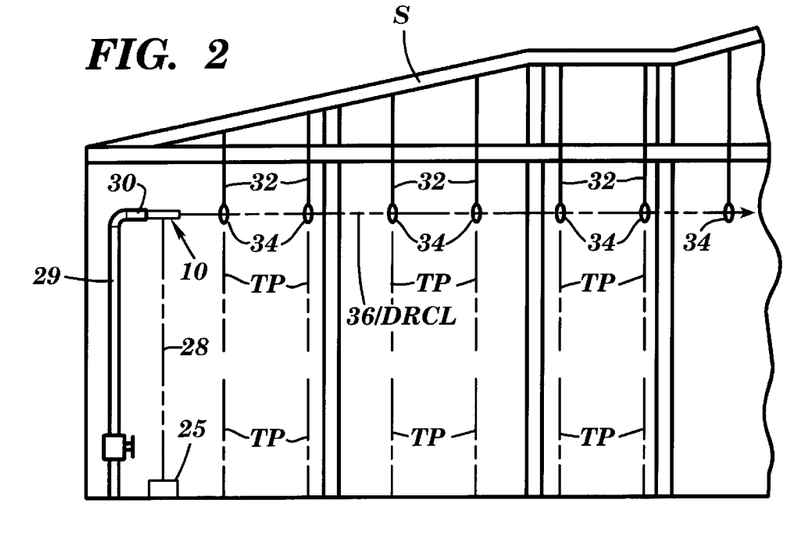
FIG. 2 is a schematic showing application of the tool during installation of a sprinkler system.
Figures 3, 4A:
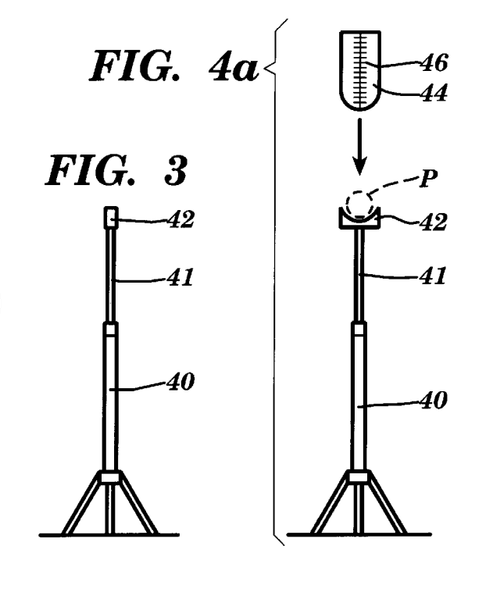
FIG. 3 is a side illustration of the target/pipe stand.
FIG. 4a is a front illustration of the target/pipe stand showing a pipe cross-section (phantom) and a target placard.
Figure 4B:
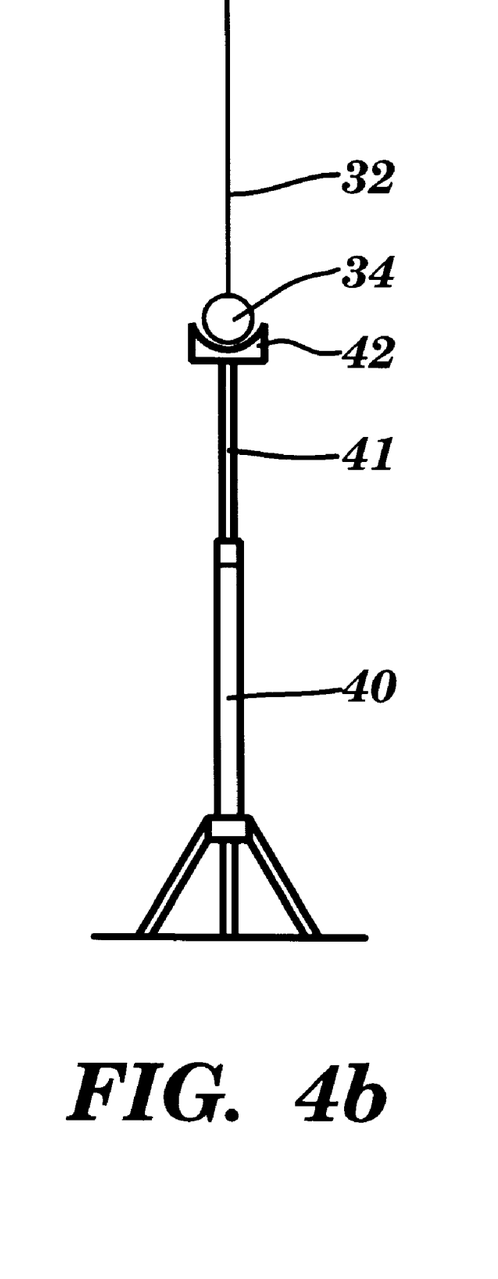
FIG. 4b is a front illustration of the target/pipe stand showing a pipe strap bracket cross-section.

Referring specifically to FIG. 3, a telescoping stand 40 with extension 41 and U bracket 42 is disclosed in side elevation. FIG. 4 illustrates the FIG. 3 device in frontal elevation, with additional incidents. The U bracket 42 is shown as receiving a pipe (phantom cross-section) P resting within the cup of the bracket 42. The bracket 42 is slotted (see FIG. 7) to receive therein either circular placard 48 or a curvilinear placard 44. The target placards are generally inserted in the bracket 42 and the stand is presented in essentially the areas shown in FIG. 2 (TP) for target position. Once the stand 40 with target 44, 48 is properly aligned with the downrange centerline DRCL, the placards may be removed. Then, either a pipe section P is installed, resting on the bracket 42, or a suspension and pipe strap bracket 32/34 is constructed so that the bracket 34 occupies the position shown by the pipe section P of FIG. 4. This process is continued seriatim until all of the pipe sections are in place and supporting and/or brackets securely attached.

Figures 5, 6, 7, 8, 9:
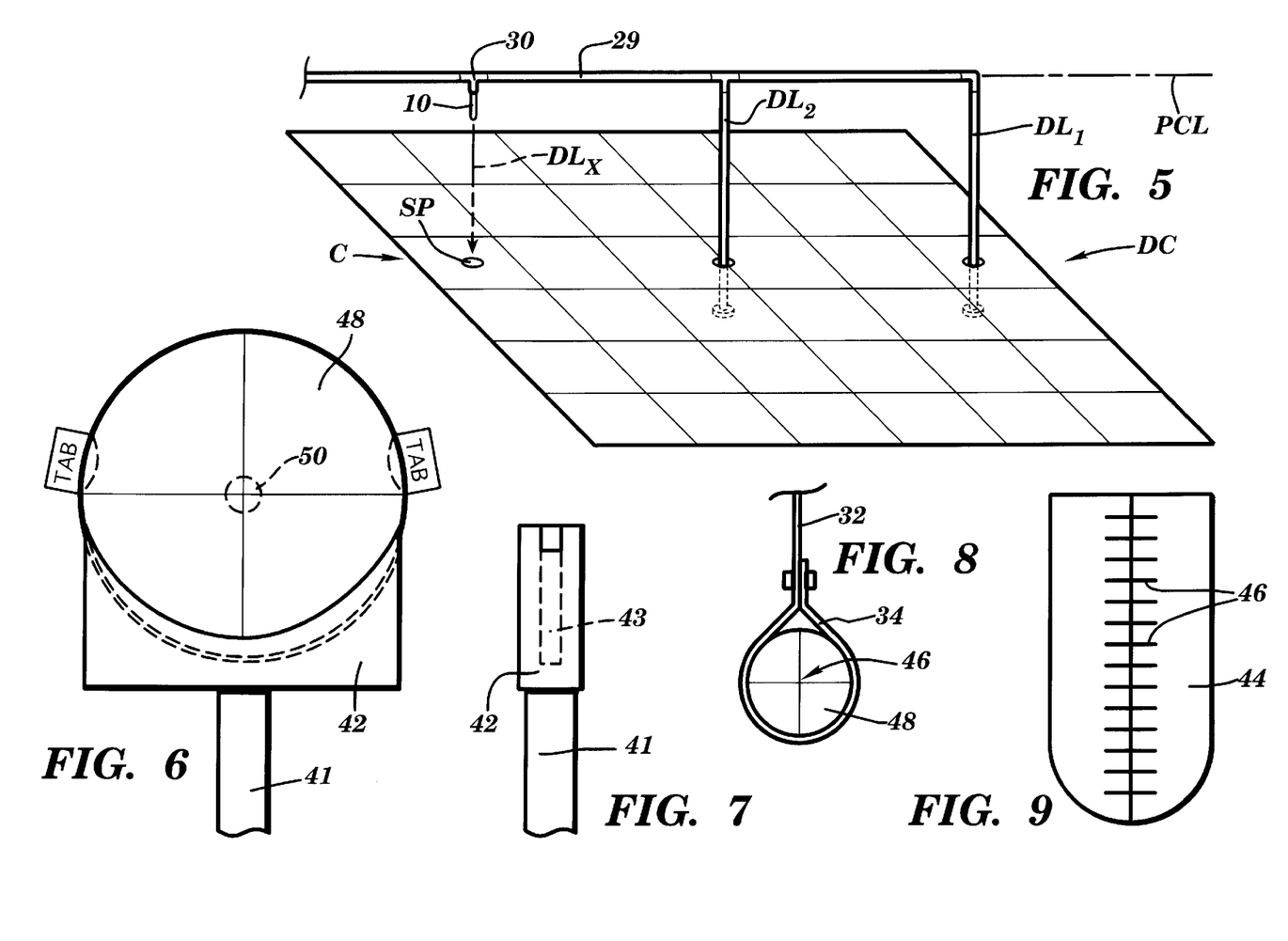
FIG. 5 is another application of the tool during installation of a sprinkler system with a drop ceiling.
FIGS. 6 through 9 illustrate a circular target placard and stand bracket in frontal elevation, the bracket in side elevation; a pipe strap-captured circular target and an indexed curvilinear placard, respectively.

Another common pipe array for a sprinkler system is depicted in FIG. 5. There, a sprinkler pipe network 29, 30 is being installed overhead and constructed to project down through a drop ceiling DC. After the pipe array 29, 30 is constructed, as was the network described in FIG. 2, the alignment tool 10 is fitted, by the coupling device, into downward projecting elbows or tees (as seen in association with downlines $DL_x$) in order to locate the proper subpoint SP through which to pass the downline. As preparations for locating the subpoint are being made, a first column C of ceiling panels, part of the drop ceiling DC, are removably installed. A round target placard 48 (as seen in FIG. 6) is generally used beneath the tool 10 in order to locate the subpoint SP that is illuminated by the beam in the DRCL. A placard 48, which has its perforable center 50 removed, may be manipulated in the DRCL until the perforable center 50, which has been removed, is illuminated. At this point, the beam is shut off and a marking pencil is used to denote the center of the subpoint which is exposed on the drop ceiling panel through the perforable portion 50 of the placard 48. With all supports for the drop ceiling in place, the marked panel may now be set (in place) and the succeeding subpoints for downlines $DL_{2-x}$ located. Those skilled in the assembly of such apparatus should realize that any mode or any method of installation may be used, the aforesaid merely being given as an example.

FIG. 6 is an illustration of the bracket 42 set upon the stand extension 41. The arch, that is the U shape, of the bracket 42 may differ from the curvature of the target placard 48, here a disc. The target disc 48 may be manufactured in several diameters in order to accommodate capture by pipe strap brackets (Shown in FIG. 8). The bracket 42, however, should be able to accommodate many diameters of pipe, ranging from approximately one inch O.D. to approximately six inches. Thus, the "cup" of the bracket will be shallower than the curvature of all but a six inch diameter disc placard 48 in order to accept several diameters of placard and/or pipe. FIG. 7 displays the FIG. 6 apparatus in side elevation and without the placard 48. The width of the slot 43 is somewhat exaggerated since it will depend generally on the thickness of the placard 48 which is to be inserted therein.

A typical arrangement of the target apparatus that was used in the FIG. 2 description is now set forth in FIG. 8. Therein, the placard 48, bearing crosshairs 46 is shown captive in a pipe strap bracket 34 that is attached to a suspension 32. The circular placard 48 could be securely attached using adhesive tab tape or made of a magnetic material so as to magnetically attach to the metal strap hangers. The circular placard 48 could also be attached using a combination of adhesive tab tape and magnetic material to attach to the hangers. Referring to FIG. 9, there is illustrated a frontal or target view of a curvilinear placard 44 that bears thereon a series of crosshairs 46 in central array. This placard 44 is the preferred type for use with the bracket 42. Its lower arcuate portion is designed to fit snugly in bracket 42 slot 43. When properly used, the crosshair indices 46 may be used for measuring radial distances off the bracket arch, thus enabling the alignment technician to accurately determine the centerpoint of a pipe or conduit in the network being assembled. For example, if a three inch pipe is to be used, and final installation and adjustment is to be made using the stand 40, the laser beam should be centered at a one and one half inch mark above the bracket arch. This will assure that, as a three inch pipe is guided into connection while resting on the bracket arch, the DRCL would be coincident with the pipe centerline PCL. The foregoing was given as example and is not meant to constrain application of the invention in any way.

Figure 10:
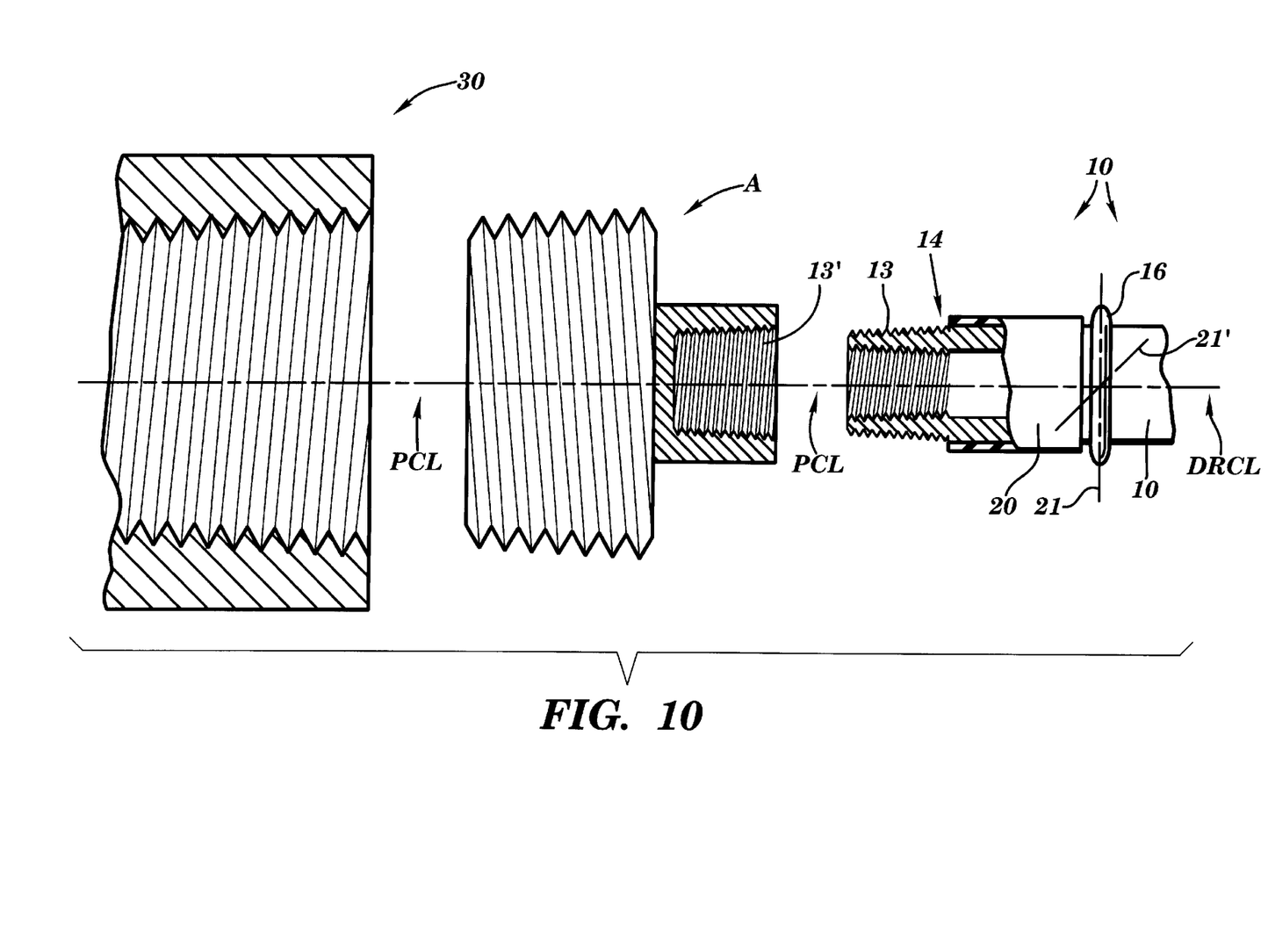
FIG. 10 illustrates a tool/pipe thread adaptation.

FIG. 10 illustrates a method for attaching the tool 10 to a pipe 30 by means of adapter A. The adapter may be a conduit piece that is used for the purposes of adapting one pipe section to another, but such is not necessary. The adapter A may be of a "homemade" type or may consist in the connection of two or more pieces of existing pipe connectors. The main purpose of this adaptation is to assure that the pipe centerline PCL is coaxially aligned with, and in effect, becomes the DRCL. For purposes of example, the threaded coupling device is used here. The reader should note that the tool 10 threaded end 14, having an exterior male thread 13, is mated to the adapter A interior threaded nipple 13' to complete the centerline mergence. The partially sectioned padding 20 is illustrated, as is its proximate feature the swivel 16. Depending upon manufacturer's desire, swivel 16 may be realized as a mechanism for effecting mere rotation through 360° or, in the alternative, a dog-leg jointing by which the centerline of the tool may be articulated to a 45° or 90° change of direction. Such would occur at the swivel joint/plane 21, 21'. Such swiveling or articulation of a tubular object is well known in the art and can be seen in many hand tools such as portable hand drills or hand grinders. Such has been contemplated for this invention, but declined in the preferred embodiment since a rigid tool axis is conducive to the final alignment and setting (or securing) of an end pipe 30 that was discussed in the first application of the invention.

Figure 11:
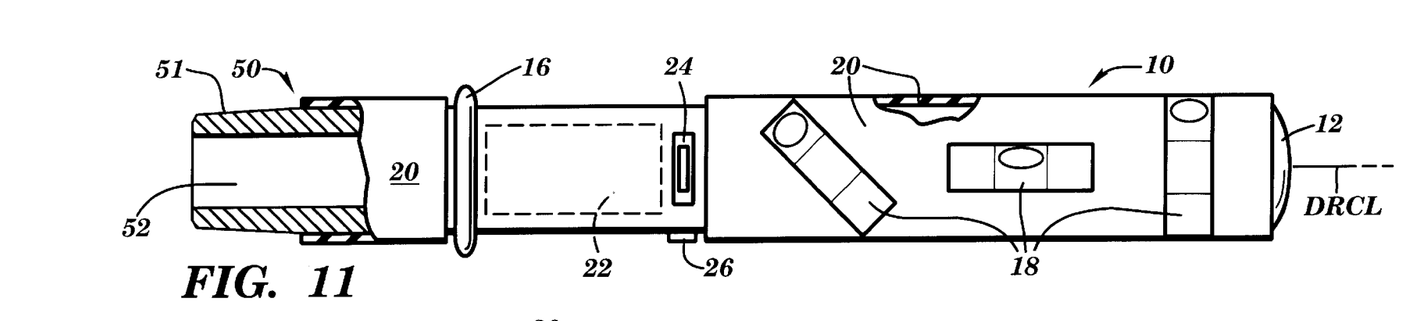
FIG. 11 illustrates an alignment tool with a smooth fitting surface coupling device.

The coupling device may be any type of device that would hold the tool on the pipe for alignment. FIG. 11 discloses the coupling device 50 with a smooth fitting surface on the outside 51 of the opening and a smooth fitting surface on the inside 52 of the opening. The smooth fitting surface allows the tool to slip into the pipe. The coupling device may also have threads on the outside and a smooth fitting surface on the inside or a smooth fitting surface on the outside and threads on the inside. The coupling device could be held in place by friction, cement, glue, or any type of bonding material.

Figure 12:
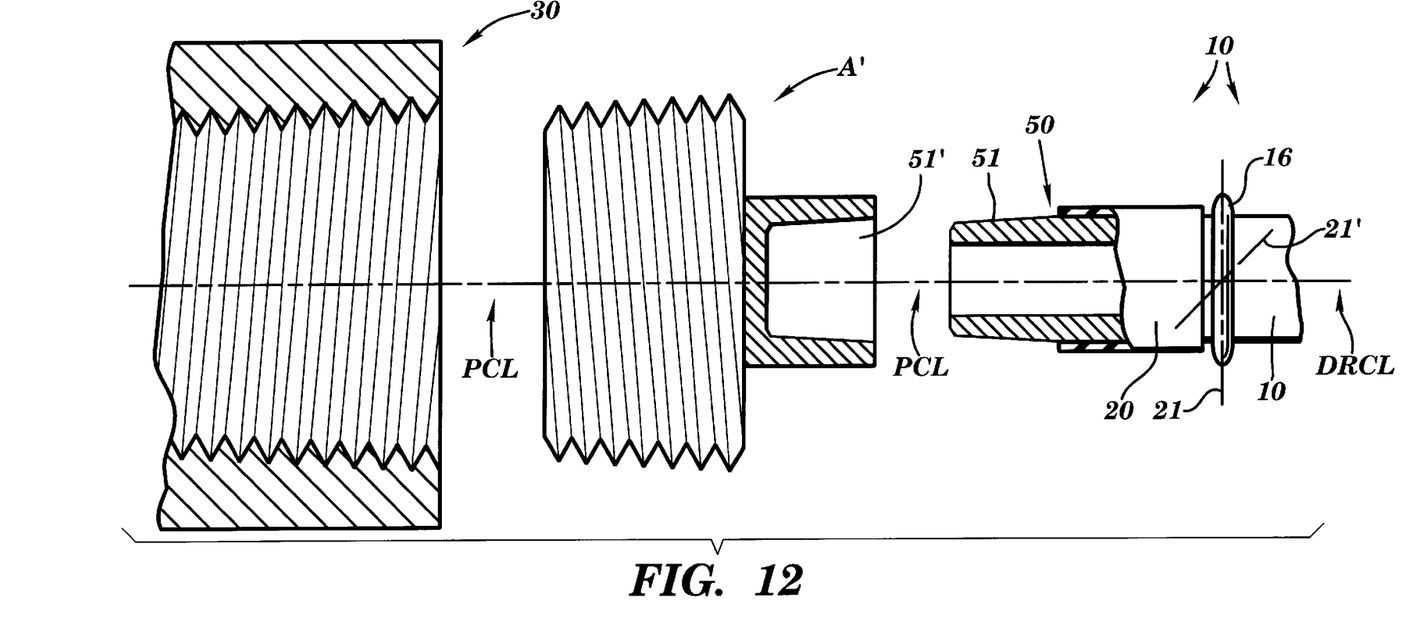
FIG. 12 illustrates a tool/pipe smooth fitting surface adaption.

FIG. 12 illustrates a method for attaching the tool 10 to the pipe 30 by means of adapter A'. The tool coupling device 50 has an exterior male smooth surface 51 which is mated to the adapter interior nipple 51' to complete the centerline mergence. The reverse could also be true and the coupling device could be the female and the adapter the male.

Figure 13:
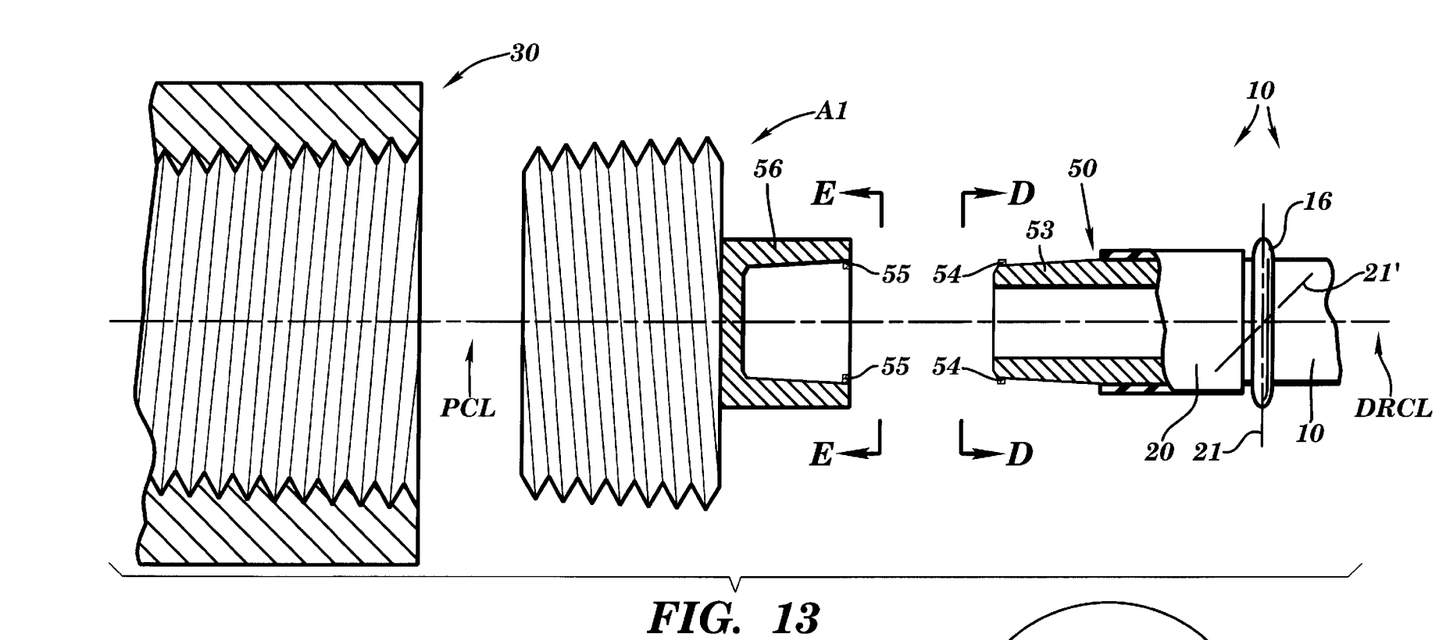
FIG. 13 illustrates a tool/pipe quick disconnect coupling device.
Figure 14:
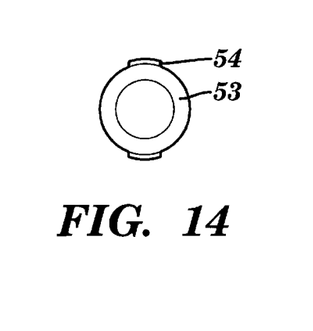
FIG. 14 illustrates a view of the quick disconnect coupling device along D—D in FIG. 13.
Figure 15:
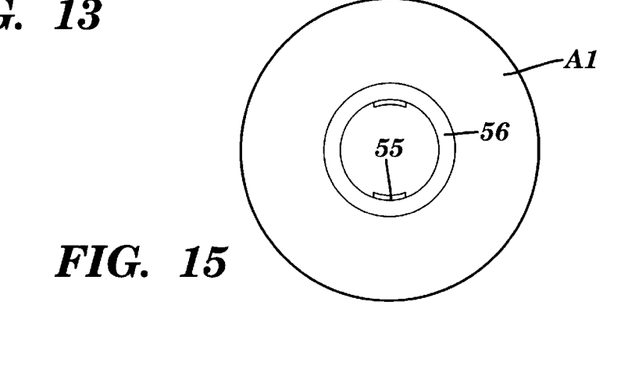
FIG. 15 illustrates a view of the adapter along view E—E in FIG. 13.

FIG. 13 shows an alternative type of quick disconnect coupling device 53 to the smooth fitting surface coupling device 51. The quick disconnect coupling device 53 would allow the tool to be quickly connected and disconnected from the adapter device A1 through the use of corresponding projections 54 and 55. Projections 54 allow the operator to insert the end of the tool between the projections 55 and then twist the tool 10 and lock it into place. FIG. 14 shows the projections 54 from a view along view D—D in FIG. 13 looking at the tool 10. FIG. 15 shows the coupling device 56 of adapter A1 from view E—E in FIG. 13.

Figure 16:
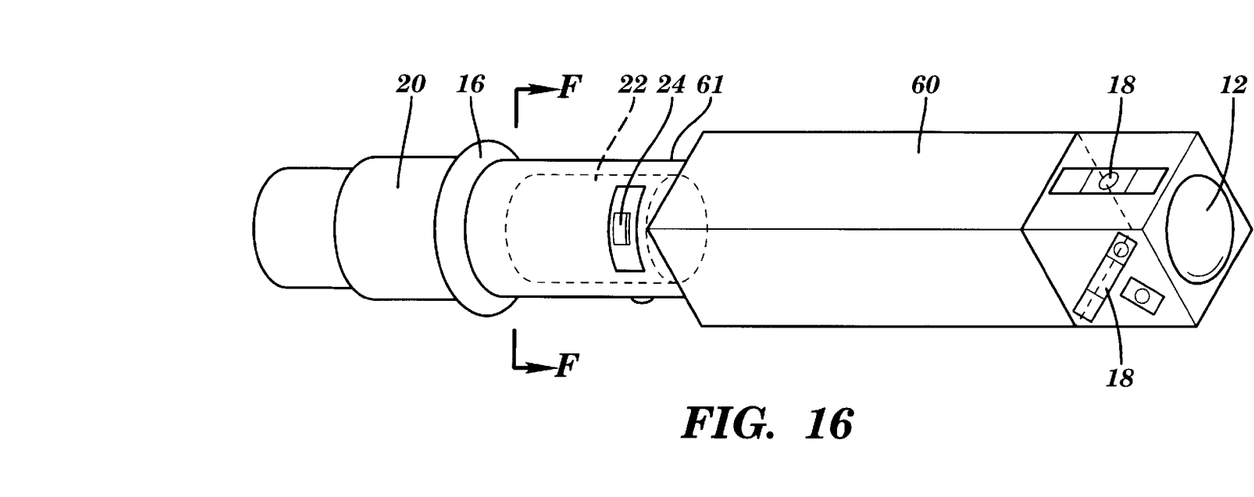
FIG. 16 illustrates another embodiment of the present invention with a rectangularly shaped end and a tubular central section.
Figure 17:
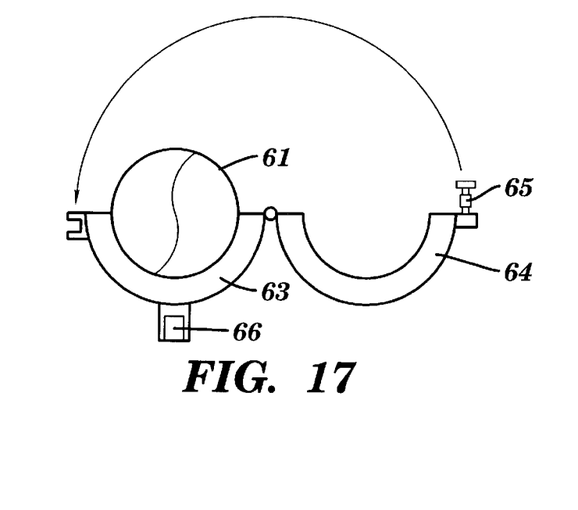
FIG. 17 illustrates FIG. 16 along view F—F with a laser bracket attached.

FIG. 16 discloses another embodiment of the present invention. The alignment tool 60 is a squared version with four bubble levels 18 mounted to each of the four sides. FIG. 17 shows view F—F in FIG. 16 with a laser bracket 62 used to mount the tool 60 to a stand similar to the one shown in FIG. 3. The tool 60 can be mounted on the stand 40 over the pipe extension device 41 by way of a mounting device 66. Therefore, the alignment method would be the same except instead of mounting the tool 60 to the end of a pipe the tool can be mounted on a stand and sighted in this manner. The laser bracket 62 mounts around the tubular region 61 of the tool 60. The laser bracket 62 is made up of a top half 63, a bottom half 64, and a screw 65 to hold the halves together around the tubular region 61 of the alignment tool 60.

Figure 18:
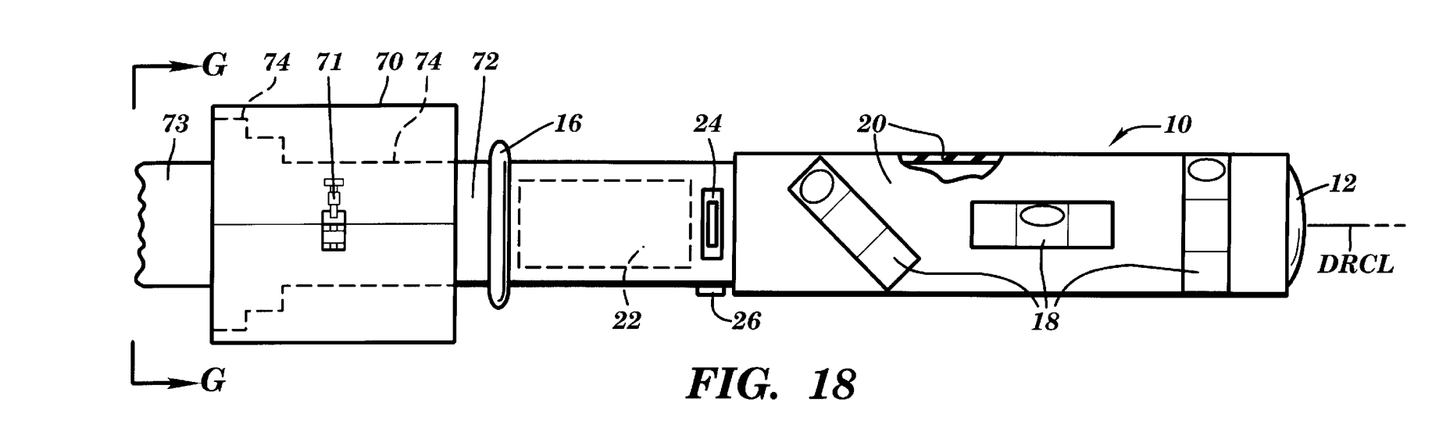
FIG. 18 illustrates an internally stepped quick connect attached to the tool.
Figure 19:
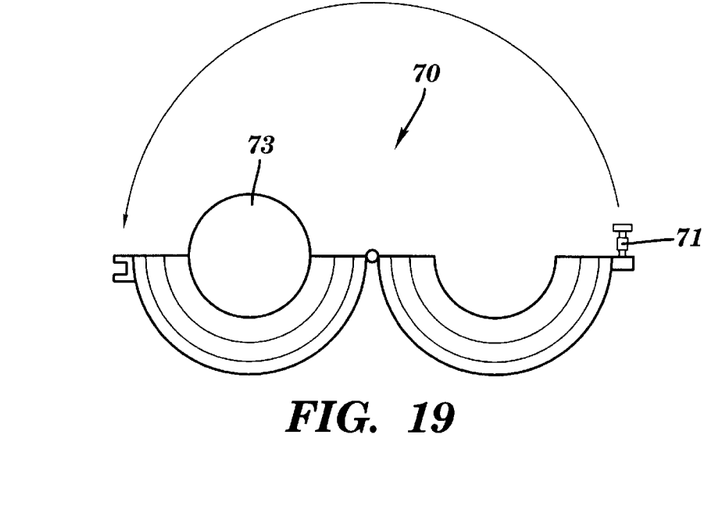
FIG. 19 illustrates a view along G—G in FIG. 18.
Figure 20:
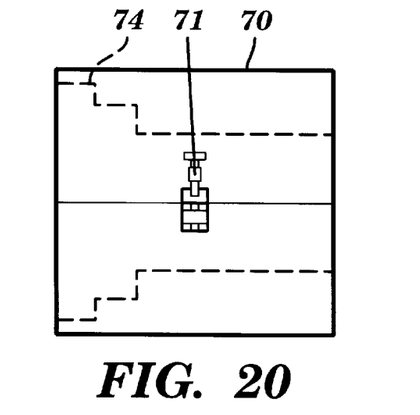
FIG. 20 illustrates the internally stepped quick connect with an internal diameter larger on the pipe side than the tool side.
Figure 21:
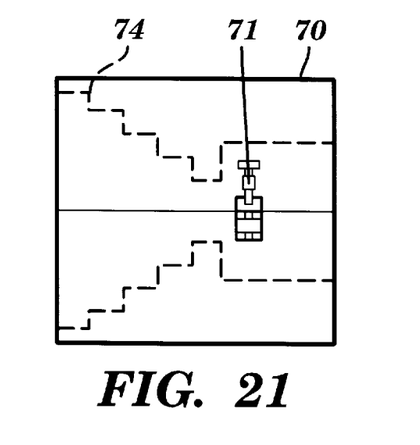
FIG. 21 illustrates the internally stepped quick connect with an internal diameter stepping down to a smaller diameter on the pipe side than the tool side.
Figure 22:
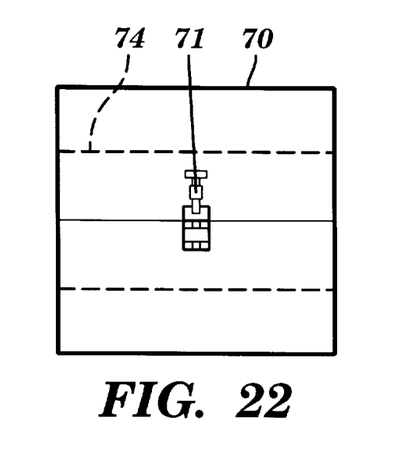
FIG. 22 illustrates the quick connect with uniform internal diameter for the pipe side and the tool side.

FIG. 18 shows another embodiment of the present invention. The alignment tool 20 has a quick connect bracket 70 which attaches the smooth end 72 of the tool 20 to a pipe 73. FIG. 19 shows the quick connect bracket 70 along view G—G in FIG. 18. The quick connect bracket can be held together using a screw 71 or another type of attaching device. The inner dimensions 74 of the quick connect bracket 70 can be varied depending on the outer dimensions of the pipe to which the alignment tool 20 will be attached. FIG. 18 shows an interior which has stepped inner dimensions 74 so that the alignment tool can be attached to a variety of diameters of pipes. FIG. 20 shows a quick connect bracket 70 designed to have a smaller internal dimension on the side of the quick connect bracket 70 which secures to the tool end 72. FIG. 21 shows the quick connect bracket 70 with a larger internal dimension on the side of the quick connect bracket which secures to the tool end 72. The quick connect bracket 70 can also have the same internal dimension on both halves as shown in FIG. 22.

Figure 23:
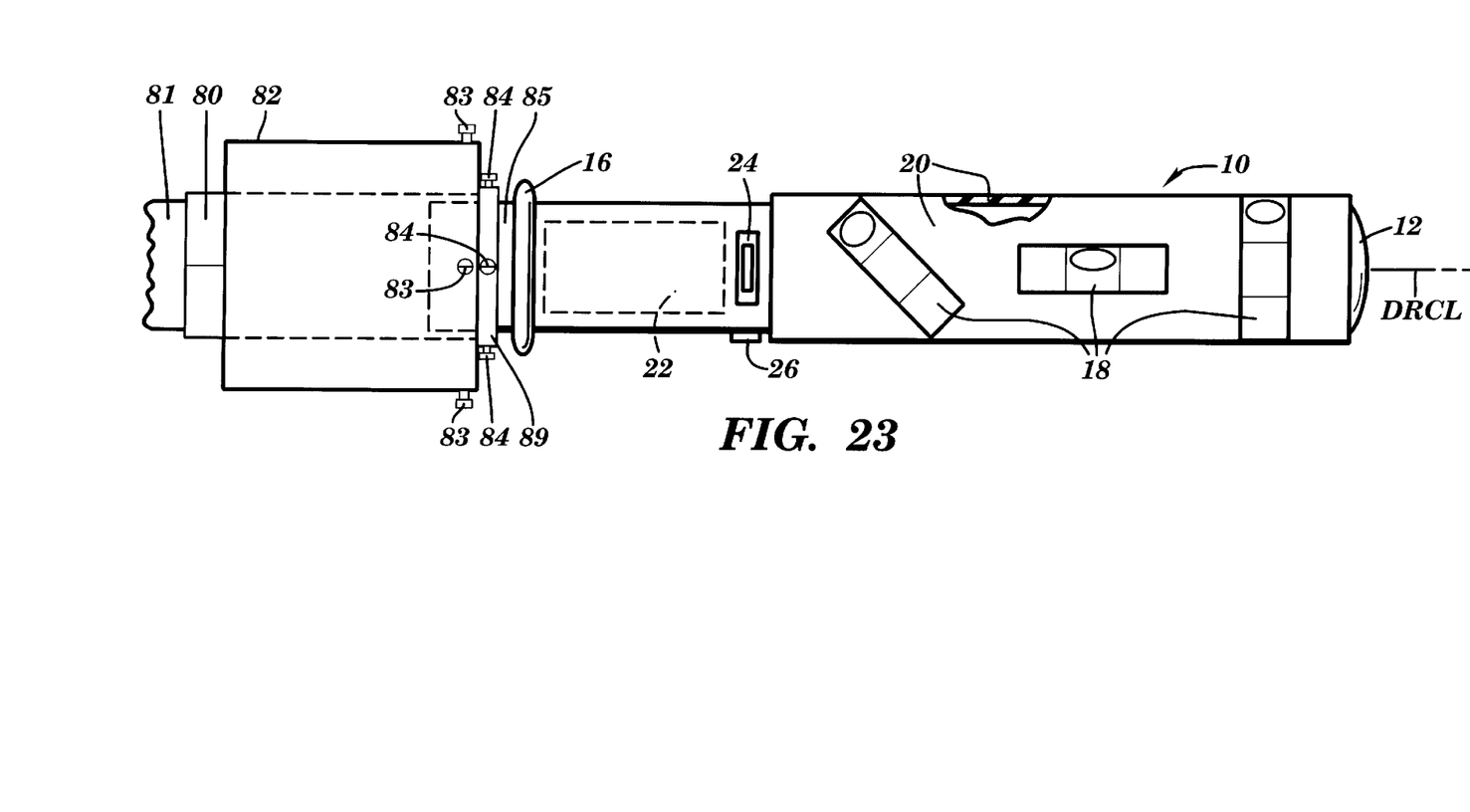
FIG. 23 illustrates a quick connect and an adapter.
Figure 24:
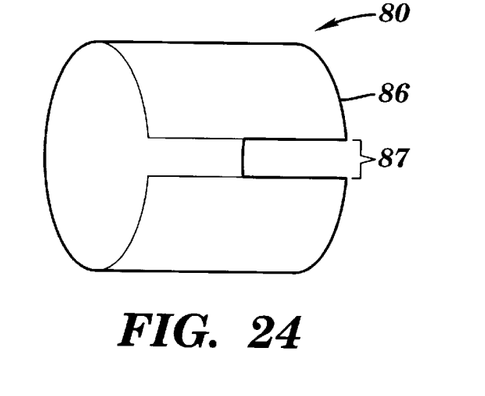
FIG. 24 illustrates a side view of the adapter.
Figure 25:
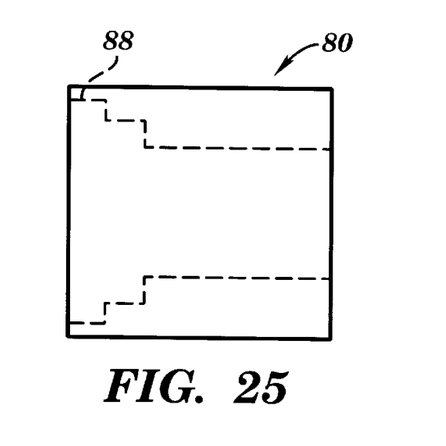
FIG. 25 illustrates a cross-section of the internally stepped adapter with an internal diameter larger on the pipe side than the tool side.
Figure 26:
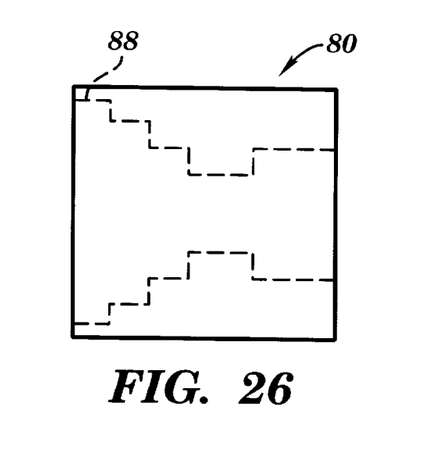
FIG. 26 illustrates a cross-section of the internally stepped adapter with an internal diameter stepping down to a smaller diameter on the pipe side than the tool side.
Figure 27:
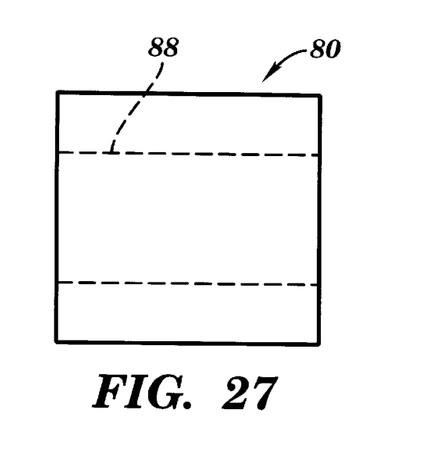
FIG. 27 illustrates the adapter with uniform internal diameter for the pipe side and the tool side.

FIG. 23 discloses another embodiment of the present invention. FIG. 23 shows a quick connect bracket 82 connected to the tool end 85 by a connecting section 89 through four attachment screws 84 (three are shown). The quick connect bracket 82 surrounds an adapter 80 which compressively seals around the tool end 85 and the pipe 81. The quick connect bracket 82 holds the adapter 80 in place using four attachment screws 83 (three are shown). FIG. 24 shows a sideview of the adapter 80. The adapter sleeve 86 shown in FIG. 24 would have a section missing 87 to allow compression around the pipe 81 when the attachment screws 83 are tightened. The adapter 80 fits inside the internal dimension of the quick connect bracket 82. The internal diameter of the adapter 80 fits the outer diameter of the pipe 81. The adapter size can vary for different pipe sizes. Also, the interior diameter of the adapter 80 can be stepped so that the same adapter can be used for a variety of different sized pipes. FIG. 25 shows the inner diameter 88 of the adapter 80 able to accommodate pipe sizes that have a larger diameter than the tool end 85. FIG. 26 shows the inner diameter 88 of the adapter 80 able to handle larger and smaller pipe diameters than the diameter of the tool end 85. FIG. 27 shows the inner diameter 88 of the adapter 80 with the same internal diameter both for the pipe and the tool end 85.

Figure 28:
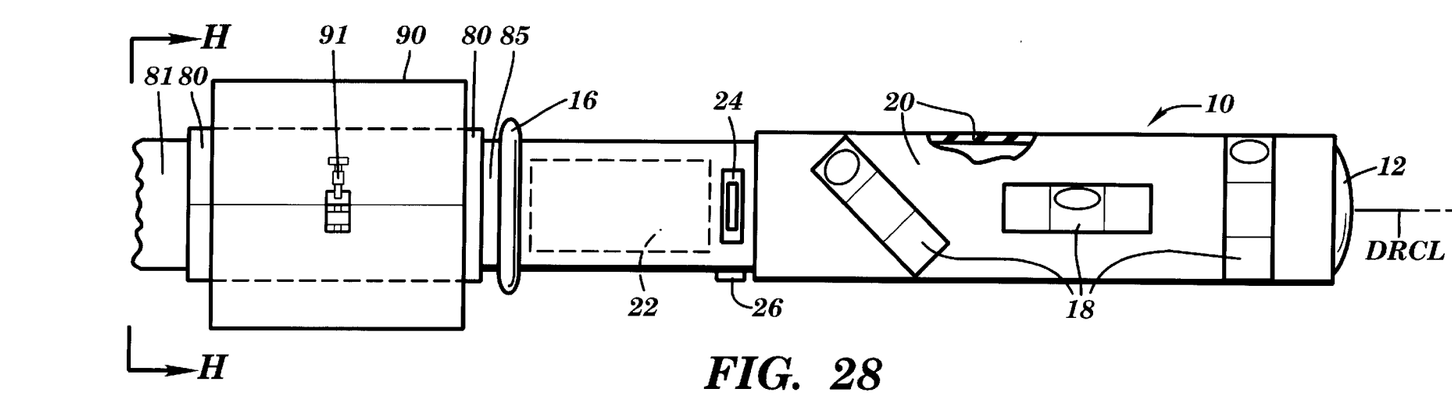
FIG. 28 illustrates another quick connect and the adapter.
Figure 29:
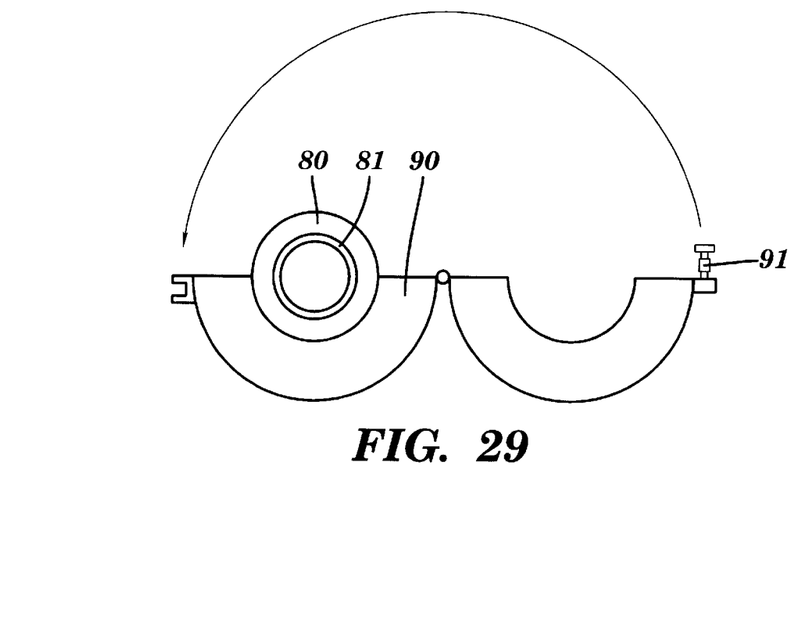
FIG. 29 illustrates a view of FIG. 28 along H—H.

FIG. 28 shows another embodiment of the present invention. FIG. 28 shows a quick connect bracket 90 which compresses around the adapter 80. The adapter 80 then compresses around the outer diameter of the pipe 81 and the tool end 85. The adapter 80 can come in different sizes to accommodate different pipe sizes. Also, the adapter can be internally stepped as shown in FIGS. 25–27. FIG. 29 shows the view along H—H in FIG. 28 of the quick connect bracket 90 encasing the adapter 80 and the pipe 81. The quick disconnect bracket 90 is fastened using an attachment device such as a screw 91.

The reader should recognize and understand that the above description was made principally by way of an example and that various modifications and differences of technique will occur to those skilled in the art, such as the alternative swivel joint/plane device discussed in FIG. 10. Those using the invention and the methodology adapted thereby are encouraged to do so consistent with the hereinafter appended claims.

What is claimed is:

1. An apparatus comprising:
    an elongate device including an elongate axis, a first portion having a first and second end, and a second portion having a first and second end;
    a rotation device operatively coupling the first end of the first portion to the first end of the second portion for relative rotation of the first and second portion about the elongate axis;
    a collimated light emanation device operatively coupled to the first portion for emanating collimated light from the second end of the first portion;
    a coupling device operatively coupled to the second end of the second portion; and
    a leveling device operatively coupled to the first portion.

2. The apparatus of claim 1, further comprising an external power source for powering the apparatus.

3. The apparatus of claim 1, wherein the elongate device further includes a compartment for storing a power source for powering the apparatus.

4. The apparatus of claim 1, wherein the coupling device includes a quick connect bracket.

5. The apparatus of claim 4, wherein the quick connect bracket is internally stepped.

6. The apparatus of claim 1, wherein the elongate device is tubular.

7. The apparatus of claim 1, wherein the first portion is rectangular and the second portion is tubular.

8. A tool comprising:
    a first portion including a collimated light emanation device for emanating collimated light from a first end of the first portion;
    a second portion having a first end operatively coupled to a second end of the first portion by a rotation device for relative rotation of the first and second portion along an elongate axis that extends through the first and second portions, the second portion including a coupling device operatively coupled to a second end of the second portion; and a leveling device operatively coupled to the first portion.

9. The tool of claim 8, wherein the first end of the first portion is rectangularly shaped.

10. The tool of claim 9, and further including a leveling device located on each side of the rectangularly shaped second end.

11. The tool of claim 8, and further including a plurality of leveling devices.

12. A method for installing piping using a tool that projects a collimated light beam, the method comprising:

attaching the tool by a coupling device to a fixing structure;

operating the tool to project the collimated light beam;

presenting a support device downrange of the tool;

presenting a target device which is illuminable by the collimated light beam on the support device, the presenting including holding temporarily in the collimated light beam a target on which a user of the tool may observe a sub-point of the beam;

removing the target device from the support device;

supporting a first conduit on the support device or a conduit fixing device element adjacent the support device;

securing the one of the first conduit and the conduit fixing device element to a structure; and repeating the above steps as a user may desire.

13. The method of claim 12, wherein the step of attaching further includes attaching the tool by the coupling device to an open ended and positioned second conduit, and leveling the tool.

14. The method of claim 12, wherein the step of attaching further includes attaching the tool by the coupling device to a support, and leveling the tool.

* * * * *